US009499876B2

(12) United States Patent
Sanchez-Vazquez et al.

(10) Patent No.: US 9,499,876 B2
(45) Date of Patent: Nov. 22, 2016

(54) BIOLEACHING BIOREACTOR WITH A SYSTEM FOR INJECTION AND DIFFUSION OF AIR

(71) Applicant: SERVICIOS CONDUMEX, S.A. DE C.V., Querétaro (MX)

(72) Inventors: Belisario Sanchez-Vazquez, Querétaro (MX); Francisco Estrada-De Los Santos, Querétaro (MX); Eric David Buendia-Cachu, Querétaro (MX); Ulises Monter-Valenzuela, Querétaro (MX)

(73) Assignee: SERVICIOS CONDUMEX, S.A. DE C.V., Querétaro (MX)

( * ) Notice: Subject to any disclaimer, the term of this patent is extended or adjusted under 35 U.S.C. 154(b) by 218 days.

(21) Appl. No.: 14/353,062

(22) PCT Filed: Oct. 12, 2012

(86) PCT No.: PCT/IB2012/002044
§ 371 (c)(1),
(2) Date: Apr. 21, 2014

(87) PCT Pub. No.: WO2013/057557
PCT Pub. Date: Apr. 25, 2013

(65) Prior Publication Data
US 2014/0239561 A1 Aug. 28, 2014

(30) Foreign Application Priority Data
Oct. 21, 2011 (MX) .................... MX/a/2011/011147

(51) Int. Cl.
*C22B 3/18* (2006.01)
*B01F 7/00* (2006.01)
(Continued)

(52) U.S. Cl.
CPC ................. *C22B 3/18* (2013.01); *B01F 7/007* (2013.01); *B01F 7/1675* (2013.01); *B01F 7/22* (2013.01);
(Continued)

(58) Field of Classification Search
CPC ........................................................ C22B 3/18
USPC .............................................................. 75/743
See application file for complete search history.

(56) References Cited

U.S. PATENT DOCUMENTS

| 4,729,788 A | 3/1988 | Hutchins et al. |
| 5,007,620 A | 4/1991 | Emmett, Jr. |

(Continued)

FOREIGN PATENT DOCUMENTS

| CN | 2256425 Y | 6/1997 |
| CN | 101735950 A | 6/2010 |

(Continued)

OTHER PUBLICATIONS

Rawlings, "Industrial Practice and the Biology of Leaching of Metals From Ores,the 1997 Pan Labs Lecture", Journal of Industrial Microbiology & Biotechnology, 20:268-274 (1998).

(Continued)

*Primary Examiner* — Scott Kastler
(74) *Attorney, Agent, or Firm* — Browdy and Neimark, PLLC

(57) ABSTRACT

A bioleaching bioreactor having an air injection and diffusion system, which allows control of the air bubble fine size, improving the oxygen and carbon dioxide distribution required by the microorganisms promoting the bioleaching process, to maintain the cellular concentration during the process. The bioleaching bioreactor includes a reactor body to contain the pulp to be processed and to allow the reaction to proceed; a support base to secure the reactor body; a pulp feeding device, protruding inwards the reactor body; an air injection and diffusion system to mix and to supply the air required by the reaction process; at least four vortex breaking elements located inside the reactor body; at least a heating element surrounding the reactor body to maintain the reaction temperature; a pulp outlet port to deliver the pulp already processed; an inlet port for the pulp to be processed; an air inlet port, located at the upper end of the reactor body; and, a vapor outlet port, located at the upper end of the reactor body.

19 Claims, 4 Drawing Sheets

(51) Int. Cl.
  B01F 7/16  (2006.01)
  B01F 7/22  (2006.01)
  B01J 8/00  (2006.01)
  C22B 3/02  (2006.01)
  B01F 3/04  (2006.01)

(52) U.S. Cl.
  CPC .. B01J 8/00 (2013.01); C22B 3/02 (2013.01); *B01F 2003/04546* (2013.01); *Y02P 10/234* (2015.11)

(56) References Cited

U.S. PATENT DOCUMENTS

| | | | |
|---|---|---|---|
| 5,143,543 | A | 9/1992 | Reid |
| 5,227,136 | A | 7/1993 | Hanify et al. |
| 6,733,567 | B1 * | 5/2004 | Dew .................. C22B 3/02 423/DIG. 17 |
| 2004/0022698 | A1 | 2/2004 | Uhrie et al. |
| 2008/0102514 | A1 | 5/2008 | Coallao Olivares et al. |
| 2011/0045581 | A1 | 2/2011 | Collao Olivares |

FOREIGN PATENT DOCUMENTS

| | | |
|---|---|---|
| GB | 2225256 A | 5/1990 |
| WO | 0029629 A1 | 5/2000 |
| WO | 2006010170 A1 | 1/2006 |

OTHER PUBLICATIONS

D.R. Tipre, S.R. Dave, "Bioleaching process for Cu—Pb—Zn bult concentrate at high pulp density" Hydrometallurgy, 75:37-43 (2004).

S. Prasad and B.D.Pandey, "Alternative Process for Treatment of Chalcopyrite-A Review", Minerals Engineering, 11 : 8 : 763-781 (1998).

Ake Sandstrom, Stig Peterson, "Bioleaching of a complex sulphide ore with moderate and extreme thermophilic microorgainsms" Hydrometallurgy 46:181-190(1997).

Henry L. Ehrlich, "Technical Potential for Bioleaching and Biobeneficiation of Ores to Recover Base Metals (Other Than Iron or Copper), Platinum-Group Metals and Silver", Biomining: Theory, Microbes and Industrial Processes, 7:129-150 (1997).

G. J. Olson, J.A. Brierley, C.L.Brierley "Progress in bioleaching: applications of microbial processes by the minerals industries", Application Microbiol Biotechnol 63:249-257 (2003).

Douglas E. Rawlings, "Heavy Metal Mining Using Microbes", Annual Review of Microbiology. 56:65-91 (2002).

Yasuhiro Konishi, Masahiko Tokushige, Satoru Asai, Toru Suzuki, "Copper recovery from chalcopyrite concentrate by acidophilic thermophile Acidianus brierleyi in batch and continuous-flow stirred tank reactors" Hydrometallurgy, 59:271-282 (2001).

* cited by examiner

BIOLEACHING BIOREACTOR WITH A SYSTEM FOR INJECTION AND DIFFUSION OF AIR

FIELD OF THE INVENTION

The present invention is related to sulfide mineral processing and metal extraction using mild or extreme thermophilic microorganisms in the Extractive Industries, and more particularly it is related to a bioleaching bioreactor with an air injection and diffusion system.

BACKGROUND OF THE INVENTION

Metallurgic extraction process for base metals (Cu, Zn, Pb), is made through the separation and concentration of sulfide minerals by differential floatation, and its pyrometallurgical processing. In the particular case of polymetallic complexes sulfide ores, there are some difficulties to produce individual concentrates of the desired grade, with a high recovery of base metals. Among the various proposed extraction treatments is the direct bleaching with different chemical agents, mainly under acidic conditions in a sulfate, chloride and nitrite media, among others. Likewise, roasting has been used as a pre-treatment for the acid bleaching (Prasad, 1998).

Another alternative in the mineral sulfide processing is using microorganisms for metal extraction, process commonly known as bioleaching. During the last 30 years, the bioleaching has been carried out in processes ranging from the bioleaching in mineral clamps, to the bioleaching in mechanically stirred tank-type bioreactors (Olson, 2003). The progress of this technology is due to the process economy, having certain advantages over the traditional mineral sulfide processing methods (Rawlings, 1998). Among these advantages, it can be said that the bioleaching does not require high energy amounts, compared with that used during the roasting or melting, it does not produce sulfur dioxide or other flue gases capable of generating residues, which are damaging for the environment (Rawlings, 2002).

Most of the first bioleaching researches and applications were focused on the mineral pre-treatment to release the gold contained in sulfides, "refractory" minerals to the conventional cyanidation process. In this process, the concentrates with high pyrite ($FeS_2$) or arsenopyrite (FeAsS) contents are subjected to a bioleaching pre-treatment, by using bacteria in mechanically stirred tank-type bioreactors to enhance the oxidation of these "refractory" gold carrying sulfides (Ehrlich, 1997; Olson, 2003).

On the other hand, oxidation of mineral sulfides in bioleaching processes is extremely exothermic; and therefore, the bioreactor requires a severe temperature control. If temperature is not dully controlled, it may result in the bacteria extinction and the stopping of the process.

Likewise, the bioreactor heat loss may provoke problems during the bioleaching process, reason why it is also very important to control any temperature reduction.

The possible heat sources or demands that may be present in the bioleaching process are the following:
Reaction heat by the mineral sulfide oxidation.
Heat generated by absorption of the stirring power.
Heat lost by the mineral pulp heating and reactor building material.
Heat lost by the injection air expansion.
Heat lost by water evaporation by the air injection.
Heat lost by convection and radiation.

In order to compensate the heat generation and/or loss in the bioreactor, and to maintain the temperature, it is necessary to supply the bioreactor with heating or cooling, as necessary.

In addition, due to the increasing environmental restrictions in most industrialized countries, a hydrometallurgical alternative to the pyrometallurgical treatment of sulfide concentrates mainly containing primary sulfides, such as galena (PbS), pseudogalena (ZnS) and chalcopyrite ($CuFeS_2$), has been searched. However, industrial applications for hydrometallurgical treatment of polymetallic sulfide admixed concentrates (bulk concentrates) are scarce (Sandström, 1997; Tipre, 2004).

As mentioned above, it is possible to carry out the mineral dissolution processing, through bioleaching in mechanically stirred tank-type bioreactors (oxygen transference).

In this sense, US Patent Application No. 2008/0102514 describes a reactor and a method for the culture, solution cation biooxidation and/or the large scale propagation of isolated microorganisms pools, such as *Acidithiobacillus thiooxidans* Licanantay DSM 17318 in combination with *Acidithiobacillus ferrooxidans* Wenelen DSM 16786, with or without the presence of other native microorganisms, which are useful to bioleach metallic sulfide ores.

Likewise, in US Patent Application No. 2011/0045581, a pneumatic (air-lift) stirred bioreactor is disclosed for the continuous production of bioleaching solutions having microorganisms to inoculate and irrigate the mineral sulfides to be bioleached in clamps and bings.

In International Publication No. WO 2000/029629, a bioreactor is disclosed to carry out biooxidation processes for metal extraction from said metal-containing materials, employing a diffusor inside the reactor to maintain bacteria viability and the metal-containing material suspension, by introducing an oxygen-containing gas into a non-mechanical stirred reactor.

Finally, an operating method for a bioleaching process in a mechanically stirred tank-type reactor is disclosed in the International Publication No. WO 2006/010170. Said method includes the step of supplying non-gaseous carbon to the microbiological cells employed in the process.

As can be seen, the bioreactor use is described in the state of the art, either with mechanical or pneumatic stirring, to produce the inoculation as solution preparation for bioleaching processes in clamps. However, reactors disclosed in the prior art have the drawback of lacking of suitable gases transference, mainly oxygen. In addition, in the particular case of stirred tank-type bioreactors, its use results in microorganisms shear, affecting the viability thereof.

Thus, a bioreactor developing has been looked for, to overcome the drawbacks found in the state of the art, providing a highly efficient gas transference during the bioleaching process.

OBJECTS OF THE INVENTION

Considering the prior art drawbacks, it is an object of the present invention to provide a bioleaching bioreactor having an air injection and diffusion system, of the mechanically stirred-type, allowing to control the air bubble fine size, improving the oxygen and carbon dioxide distribution required by the microorganisms promoting the bioleaching process, with the purpose of maintaining the cellular concentration during the process.

Another object of the present invention is to provide a bioleaching bioreactor having an air injection and diffusion system, of the mechanically stirred-type, which allows to reduce the air injected amount, compared to other reactors, during the bioleaching process.

Still another object of the present invention is to provide a bioleaching bioreactor having an air injection and diffusion system, of the mechanically stirred-type, which allows a continuous bioleaching process and thereby to achieve a high solution metal recovery.

Yet another object of the present invention is to provide a bioleaching bioreactor having an air injection and diffusion system, of the mechanically stirred tank-type, which allows a reduction in the air consumption during the bioleaching process.

SUMMARY OF THE INVENTION

The bioleaching bioreactor 100 of the present invention having an air injection and diffusion system 104, has been found allowing to control the consumption and the air bubble fine size, thereby improving oxygen and carbon dioxide distribution required by the microorganisms promoting the bioleaching process, in order to maintain the cellular concentration during the process; further carrying out a continuous bioleaching process and as a result, achieving a high solution metal recovery.

In order to achieve the above, a bioleaching bioreactor has been developed having an air injection and diffusion system generally comprising a reactor body 101 to contain the pulp to be processed, and which allows the reaction to proceed; a support base 102 to secure the reactor body 101; a pulp feeding device 103, protruding inwards the reactor body 101; a system for the air injection and diffusion 104 to mix and supply the air required by the reaction process; at least four vortex breaking elements 105, 105', 106 and 106', located around the air injection and diffusion system 104; at least a heating element 107 surrounding the reactor body 101 to maintain the reaction temperature; a pulp outlet port 108 to deliver the pulp already processed; a pulp inlet port 109 to supply the pulp to be processed; an air inlet port 110, to direct the air injection and diffusion system 104 inside the reactor body 101; and, a vapor outlet port 111, to interconnect a vapor cleaning and recovery system 127.

The bioreactor 100 operates in a temperature range from 45° C. to 80° C. and a pressure from 1.406 to 2.109 kg/cm² (20 to 30 psig) and includes a vapor cleaning and recovery system 127, coupled to the top side of the bioleaching bioreactor 100 of the present invention.

BRIEF DESCRIPTION OF THE FIGURES

The novel aspects considered characteristics of the present invention will be particularly established in the appended claims. However, some embodiments, features, and some objects and advantages thereof will be better understood in the detailed description, when read in connection with the appended drawings, wherein:

DETAILED DESCRIPTION OF THE INVENTION

Figure 1:
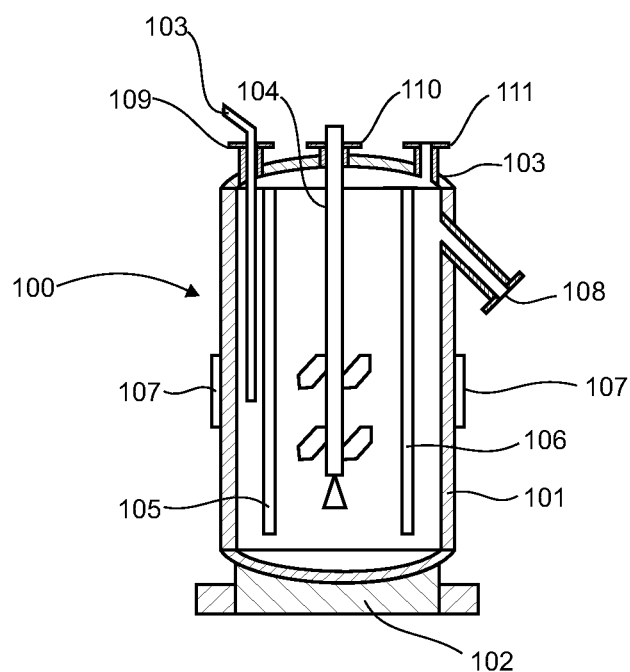
FIG. 1 is a longitudinal cross-section view of a bioleaching bioreactor having an air injection and diffusion system, construed according to the principles of a preferred embodiment of the present invention.

Now referring to the appended drawings, and more particularly to FIG. 1 thereof, a bioleaching bioreactor is shown, having an air injection and diffusion system, construed according to a particularly preferred embodiment of the invention, which should be considered illustrative and non-limitative thereof, wherein the bioleaching bioreactor 100 generally comprises a reactor body 101 to contain the pulp to be processed and to allow the reaction to proceed, including an upper cover and a bottom cover; a support base 102 to secure the reactor body 101; a pulp feeding device 103, protruding inwards the reactor body 101 through the upper cover; an air injection and diffusion system 104 to mix and supply the air required by the reaction process, which is centrally located and which protrudes inside the reactor body 101 through the upper cover; at least four vortex breaking elements 105, 105', 106 and 106' located around the air injection and diffusion system 104 on the inner wall and along the reactor body 101; at least a heating element 107 surrounding the reactor body 101 to maintain the reaction temperature; a pulp outlet port 108 to deliver the pulp already processed, located laterally at the top of the reactor body 101; a pulp inlet port 109, located at the upper cover of the reactor body 101, wherein the pulp feeding device is introduced 103 inwards the reactor body 101; an inlet port 110, located at the upper cover of the reactor body 101, wherein the air injection and diffusion system 104 is introduced inwards the reactor body 101; and, a vapor outlet port 111, located at the upper cover of the reactor body 101, wherein a vapor cleaning and recovery system 127 is interconnected.

Figure 2:
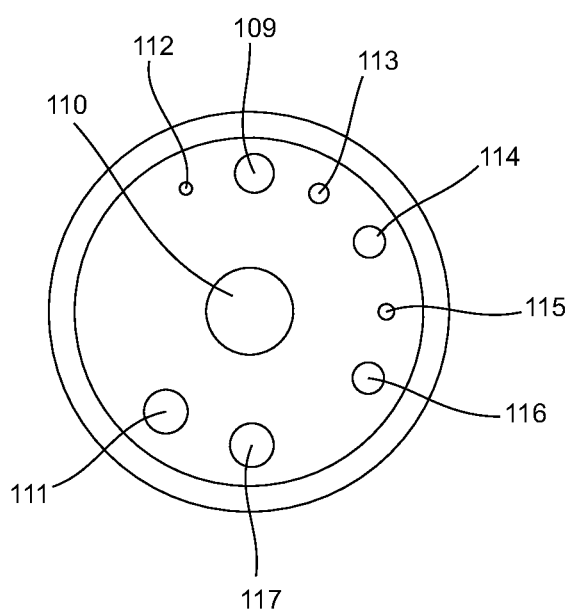
FIG. 2 is a plant view of the upper cover of the bioleaching bioreactor shown in FIG. 1.

Referring to FIG. 2, this shows how a plurality of access ports 109 to 118 are distributed in the upper cover of the reactor body 101, for the interconnection of the diverse instruments and devices required for the operation of the bioleaching bioreactor 100.

The plurality of access ports 109 to 118 preferably having a circular-shape and different sizes (diameters) depending on the process requirements, being distributed along the entire surface of the upper cover of the reactor body 101, preferably being located at the center and at the periphery of said upper cover according to the structural design requirements and process design of the bioreactor 100.

The access port 109 is an inlet port for the pulp to be processed, located at the periphery of the cover, wherein the pulp feeding device 103 is introduced inwards the reactor body 101; the access port 110, is a port to accept the air injection and diffusion system 104, located at the center of the cover, wherein said system 104 is introduced inwards the reactor body 101; the access port 111, is a vapor outlet port, located at the periphery of the cover, wherein a vapor cleaning and recovery system is interconnected; the access ports 112 and 115 allow the interconnection of the required instruments to measure and control the reaction temperature, being located at opposite sides and at the periphery of the cover; the access port 113 is a recovered water inlet port, located at the periphery of the cover, to allow the coupling of a recovered water feeding device; the access ports 114 and 116 are ports to interconnect the instruments, located at the periphery of the cover, to allow the interconnection of the required instrumentation for measuring pH, ORP and dissolved oxygen; and, the access port 117 is an inspection port, located at the periphery of the cover, to allow the coupling of a sight hole for the revising of the reactor body 101 inside.

Figure 3:
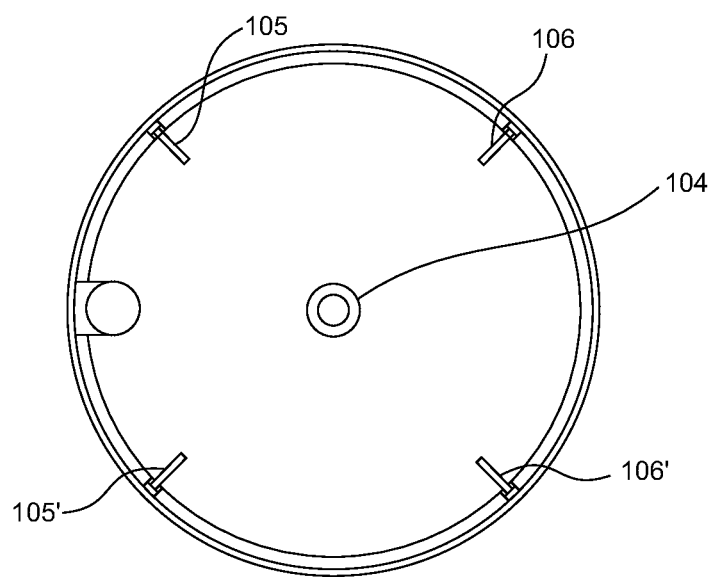
FIG. 3 is a plant view of the bioleaching bioreactor shown in FIG. 1, without the upper cover and to show the location of the vortex breaking elements.

With regard to FIG. 3, this shows the location of at least four vortex breaking elements 105, 105', 106 and 106', which are located around the air injection and diffusion system 104, perimetrically on the inner wall and along the reactor body 101, equidistantly separated to each other at an angle of 90°. The vortex breaking elements 105, 105', 106 and 106', in the embodiment being described, have a rectangularly-shaped cross-section; however, depending on the bioreactor design requirements, they may adopt any other geometrical shape; further to increasing its number depending on the bioreactor size.

Figure 4:
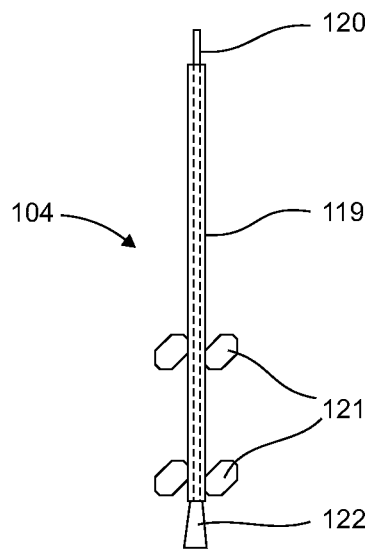
FIG. 4 is a side view of an air injection and diffusion system, employed in the bioleaching bioreactor of the present invention.

In FIG. 4 an air injection and diffusion system 104 is shown, to mix and to supply the air required by the reaction process, which generally comprises a concentric tube array shown as 119 for the outer tube, whereby a required air flow is fed for the reaction process, and as 120 for the inner tube, whereby a required water flow is injected for the bioleaching reaction; a plurality of mixing drivers 121, located at the outer tube lower portion 119 from its intermediate section; and, an spraying/dispersion system 122 located at the concentric tube array lower end.

Figure 5:
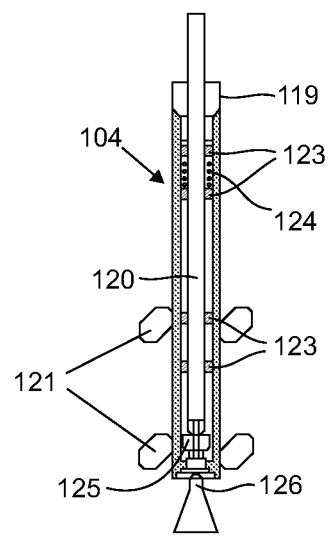
FIG. 5 is a longitudinal cross-section view of the air injection and diffusion system shown in FIG. 4 and which is employed in the bioleaching bioreactor of the present invention.

Referring to FIG. 5, a longitudinal cross-section view is shown of the air injection and diffusion system 104, to show the inside details thereof. The outer tube 119 of the concentric tube array, includes in its inner portion, a plurality of concentric locating elements 123 distributed by pairs along the tube inner portion, having the purpose of perfectly concentrically securing and aligning the inner tube 120. Additionally, a spring 124 is located between each pair of concentric locating elements 123, to assist in securing and aligning the inner tube 120. At the concentric tube array lower end (outer tube 119 and inner tube 120), the spraying/dispersion system 122 is located, which includes an spraying device 125, which purpose is to spread under pressure the water entering through the inner tube 120, and a spraying nozzle 126 assisting to improve the air distribution at the pulp core being subjected to the bleaching reaction in the reactor body 101.

Figure 6:
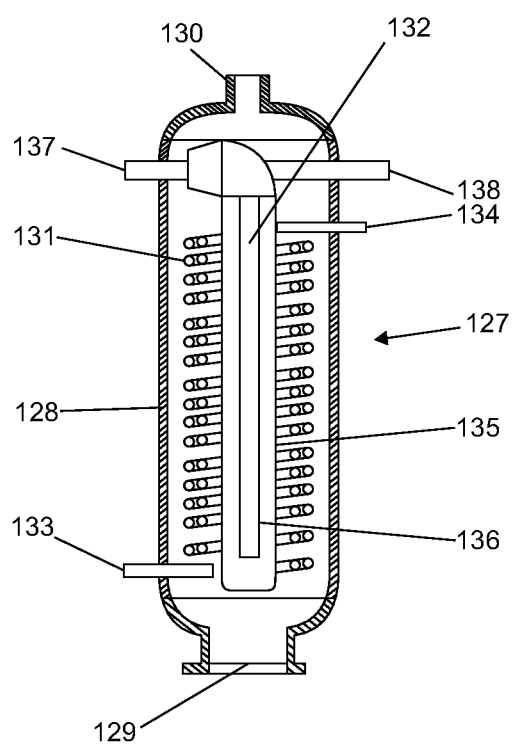
FIG. 6 is a longitudinal cross-section view of a preferred embodiment of a vapor cleaning and recovery system, coupled to the top of the bioleaching bioreactor of the present invention.

Finally, in FIG. 6 a longitudinal cross-section view is shown of a preferred embodiment of a vapor cleaning and recovery system 127, being coupled to the top of the bioleaching bioreactor 100 of the present invention.

The vapor cleaning and recovery system 127 comprises at least two cooling steps and consists of a cylindrically-shaped main body 128, having a vapor inlet nozzle 129 at its lower end and a clean gas outlet nozzle 130 at the upper end. At the main body 128 inside and all along thereof, are located at least a pair of first and second condensing devices 131 and 132 respectively, to cool, condense and recover water vapors from the bioreactor 100.

The first condensing device 131 consists of a pair of cooling coils, a main one and a secondary one interconnected to each other, which are distributed inside and along the main body 128 around the second condensing device 132, with a cold water inlet 133 and a hot water outlet 134, located at the main body 128 at its lower and upper ends, respectively.

The second condensing device 132 is located inside the main body 128 all along and at the center thereof, consisting of a water circulation central system having a cooling water circulation central system comprising a casing 135 to contain cooling water and a tube 136 located inside said casing 135 at the center and all along thereof, through which the cooling water exits once being used, with a cold water inlet 137 interconnected to the casing 135 and a hot water outlet 138 interconnected to the tube 136. Both the cold water inlet 137 and the hot water outlet 138 are located opposite to each other at the upper end of the casing 135 and they protrude outside the main body 128 through its upper end.

It is worth mentioning that the vapor cleaning and recovery system 127 by means of its structural design may be readily dismounted to carry out the internal maintenance and cleaning operations.

In a preferred embodiment, the bioleaching bioreactor 100 having an air injection and diffusion system 104, consists of a stirred tank-type reactor with a cylindrically-shaped reactor body 101, having torispherical lower and upper covers.

The bioreactor 100 operates in a temperature range from 45° C. to 80° C. and a pressure from 1.406 kg/cm$^2$ to 2.109 kg/cm$^2$ (20 a 30 psig), operating preferably at a temperature of 70° C. and a pressure of 1.7575 kg/cm$^2$ (25 psig).

In the preferred embodiment being described, the employed heating element 107, is electric heater in a band-shape, manufactured with a corrosion resistant material, connected to a 220 volts line.

It is important to mention that up to 200 liters bioreactors, electric heaters are used as a heating media, while for bioreactors higher than 200 liters, conventional heat exchangers are used, according to the bioreactor design requirements and to meet the conditions of the bleaching process.

Temperature control is made by the PID controller PID, which is attached to a corrosion resistant temperature sensor. In order to preserve the supplied heat, the reactor has a thermic insulation and it is covered by a metallic protection.

The upper cover has an inlet port 110 including a coupling base supporting the air injection and diffusion system 104, further having a pulp inlet port 109 in the form of an interconnection nozzle which allows the pulp inlet by the top through a pulp feeding device 103 consisting of a tubing submerged in the reactor underneath the pulp solution level; in addition having a vapor outlet port 111 whereby it interconnects the vapor cleaning and recovery system 127, also known as pre-condenser, to allow the vapors to exit and be recovered. The upper cover has the access port 113, which is a recovered water inlet port.

The water vapor cleaning and recovery system 127 is constituted by a cylindrically-shaped main body 128, having an interconnection nozzle/flange in its lower end 129 to be connected to the bioreactor 100 as a vapor inlet.

The system has two cooling steps 131 and 132; the first includes a pair of cooling coils, one main and one secondary, interconnected to each other, with cooling water inlets and outlets. The second is a cooling central system, having a cooling water inlet and outlet. Both systems are interconnected at the equipment exterior and are readily dismountable for the internal cleaning.

During normal operation, water vapors extracted from the bioreactor 100 are passed through the water vapor cleaning and recovery system 127, wherein the gas speed is reduced, and it interacts with the coils and the cooling central system. The vapor flow entrains mineral particles in particle sizes less than 20 microns, which are trapped in the coils and the water recovered therein, descends again inside the reactor carrying the fines to be returned again to the pulp.

The bioreactor 100 comprises an air injection and diffusion system 104 integral to the stirring system comprising an axe, an air-water injection and diffusion system, as well as stirring and mixing means. Stirring is carried out by a motor having a pulley set, the main axe supports one or more commercial drivers (Ligthnin A315-type), the main axe is formed by a hollow bar, inside the bar there is an air injection spear, centered by a concentric locator. The upper side of the main axe is attached to a rotatory joint through an extension, wherein the addition of the water and gases required for the bioleaching is made, the lower side of the axe is characterized by an sprayer protected by a guard, and connected to a nozzle with the purpose of providing gas bubbles with a fine size.

It is worth mentioning that when operating the bioreactor 100 in a temperature range of 45° C. to 80° C., water is lost by evaporation, and by the air injection. Water loss is recovered by the condensation system action (heat exchangers), located at the bioreactor 100 vapor exit.

In the embodiment being described, the bioreactor has at the vapor exit two condensation systems, the first located directly over the bioreactor and consisting of the above-described water vapor cleaning and recovery system 127; and, a second condensation system, in series located at the water vapor cleaning and recovery system outlet 127, consisting of a conventional plate-type condenser.

In a typical operation of a 200 liters bioreactor, 10 liters water/day are evaporated keeping an air flow of 100 liters per minute (LPM) and an operating temperature of 70° C. From the total water volume being recovered, 4 liters/day are recovered in the first condensation system and they are returned directly to the bioreactor, while the remaining 6 liters/day are recovered in the second condensation system. The recovered water accumulates in a container and is returned to the bioreactor by its addition to the air/water mixture injection system.

On the other hand, and making reference to the kind of thermophilic bacteria employed, mild thermophilic microorganisms or extreme thermophilic microorganisms can be employed for the bioleaching process; however, due to the bioreactor features of the present invention, Acidianusbrierleyi and Metallosphaerasedula-type extreme thermophilic bacteria strains are employed for the bioleaching process.

Acidianusbrierleyi and Metallosphaerasedula bacteria uses ion Ferric oxidation and Sulfur oxidation as energy source; besides of having the ability to extract zinc and copper form the polymetallic concentrate in the pulp fed to the bioreactor.

The present invention will be better understood from the following examples, which are shown only with illustrative purposes to allow a better comprehension of the preferred embodiments of the present invention, without implying that there are not other embodiments non-illustrated capable of being practiced based on the above detailed description.

EXAMPLES

Example 1

An assay in a 200 liters bioreactor was made, with the purpose of validating the solid percentage homogeneity in the bioreactor core, carrying out diverse tests varying the drivers number, as well as the injection flow of an air/water mixture.

To this end, 200 liters of water was fed to the bioreactor, and 40 kg of zinc concentrate was added having a particle distribution with a p80 of 120 microns.

The stirring speed was set to 300 RPM and the tests were carried out modifying the drivers number, further varying the injection flow of the air/water mixture.

The water solid concentration average was measured (wt %) at 5 different deeps, obtaining the results shown in Table 1:

TABLE 1

| Condition | Drivers number | wt % Water/air mixture Injection |
|---|---|---|
| Assay 1 | 1 20% | Yes 20% |
| Assay 2 | 1 20% | No 20% |
| Assay 3 | 2 20% | Yes 20% |
| Assay 4 | 2 20% | No 20% |

The obtained results show an excellent stability of the solid dispersion, even if a single driver is used, what would allow to reduce the operation costs at an industrial level.

Example 2

An assay was made with the purpose of validating the air injection efficiency, by varying the air/water mixture injection flow.

To this end, 200 liters of water was fed to the bioreactor and 10 kg of Iron concentrate was added with a particle distribution having a p80 of 20 microns.

It was maintained at constant temperature of 70° C. and a fix stirring speed of 300 RPM with a single drive for stirring.

The air/water mixture ratio was maintained constant to values of 1 $m^3$ of air per each 0.05 liters per minute (LPM) of water. The original reactor design is of 200 LPM injection of the air/water mixture and the parameter to control the flow is the concentration of Dissolved Oxygen (DO) in the pulp with bacteria present, which has to be maintained around 2 ppm. Tests were made modifying the air/water mixture flow and the DO was monitored.

The obtained results are shown in Table 2:

TABLE 2

| Condition | Mixture flow in LPM | Dissolved Oxygen ppm |
|---|---|---|
| Assay 1 | 200 | 3.50 |
| Assay 2 | 150 | 3.45 |
| Assay 3 | 100 | 3.15 |
| Assay 4 | 50 | 2.50 |

As can be seen, the obtained results show that at flows higher than 100 LPM, an excess injection of air/water mixture occurs, thereby increasing the operation costs without any benefits in the process; while at flows of 50 LPM the distribution of the oxygen required by the microorganisms promoting the bioleaching process is improved (Dissolved Oxygen concentration), which may be maintain around 2 ppm.

According to the above-described, it may be seen that the bioleaching bioreactor having an air injection and diffusion system of the present invention, has been envisioned to solve the prior art problems, by controlling the air bubble fine size supplied to the bioreactor, thereby improving the oxygen and carbon dioxide distribution required by the microorganisms promoting the bioleaching process; therefore, it will be evident for a skilled in the art that the bioleaching bioreactor embodiments having an air injection and diffusion system as described above, and shown in the appended drawings, are only illustrative and non-limitative of the present invention, since numerous considerable changes are possible in its details without departing from the scope of the invention.

Therefore, the present invention shall not be considered as restricted except for the prior art demands and by the scope of the appended claims.

The invention claimed is:

1. A bioleaching bioreactor having an air injection and diffusion system, comprising:
    a reactor body to contain pulp to be processed and to allow the reaction to proceed;
    a support base to secure the reactor body;
    a pulp feeding device, protruding inwards of the reactor body;
    a mechanically stirred air injection and diffusion system having a plurality of mixing drivers to mix and to supply the air required by the reaction process;
    at least four vortex breaking elements located around the air injection and diffusion system inside the reactor body;
    at least a heating element to maintain reaction temperature;
    a pulp outlet port, to deliver the pulp already processed;
    a pulp inlet port, to supply the pulp to be processed;
    an air inlet port, located at an upper end of the reactor body; and,
    a vapor outlet port, located at the upper end of the reactor body,
    wherein the reactor body includes an upper cover and a lower cover at its ends; and the air injection and diffusion system is centrally located at the upper cover and protrudes inwards of the reactor body.

2. The bioleaching bioreactor having an air injection and diffusion system, according to claim 1, wherein
    the pulp feeding device protrudes inwards the reactor body through the upper cover;
    the four vortex breaking elements are located perimetrically on an inner wall and along the reactor body, equidistantly separated from each other at an angle of 90°;
    the heating element is externally located and around the reactor body;
    the pulp outlet port is laterally located at a top of the reactor body;
    the pulp inlet port, is located at the upper cover of the reactor body, where the pulp feeding device is introduced inwards the reactor body;
    the air inlet port is located at the upper cover of the reactor body; and,
    the vapor outlet port is located at the upper cover of the reactor body.

3. The bioleaching bioreactor having an air injection and diffusion system, according to claim 2, wherein the vortex breaking elements adopt a rectangularly-shaped cross-section, and more vortex breaking elements are provided for larger size bioreactors.

4. The bioleaching bioreactor having an air injection and diffusion system, according to claim 2, wherein a plurality of access ports required for the interconnection of the different instruments and devices required for the bioreactor operation are introduced in the upper cover of the reactor body, said plurality of access ports located at a center and a periphery of said upper cover.

5. The bioleaching bioreactor having an air injection and diffusion system, according to claim 4, wherein the upper cover includes:
    an inlet port for the pulp to be processed, located at the periphery of the cover, wherein the pulp feeding device is introduced inwards the reactor body;
    a port to admit the air injection and diffusion system, located at the cover center, wherein said system is introduced inwards the reactor body;
    a vapor outlet port, located at the periphery of the cover, wherein it the vapor outlet port interconnects a vapor cleaning and recovery system;
    at least two access ports for interconnection of instrumentation required to measure and control the reaction temperature, located at opposite ends and the periphery of the cover;
    a recovered water inlet port, located at the periphery of the cover, to allow the coupling of a recovered water feeding device;
    at least two access ports for interconnection of instrumentation required to measure the pH, ORP and dissolved oxygen, located at the periphery of the cover; and,
    an inspection port, located at the periphery of the cover, to allow coupling of a sight hole to monitor the reactor body inside.

6. The bioleaching bioreactor having an air injection and diffusion system, according to claim 1, wherein the air injection and diffusion system comprises:
    a concentric tube array consisting of an outer tube where an air flow required for the reaction process is fed, and an inner tube where a water flow required for the bleaching reaction is fed;
    a plurality of mixing drivers, located at an outer tube lower portion from its intermediate section; and,
    a spraying/dispersion system at a lower end of the concentric tube array.

7. The bioleaching bioreactor having an air injection and diffusion system, according to claim 6, wherein the outer tube of the concentric tube array, includes in an inner portion, a plurality of concentric locating elements distributed by pairs along the tube inner portion, which object is to fix and to perfectly align in a concentric manner the inner tube, situating between each pair of concentric locating elements a spring to assist securing and aligning the inner tube.

8. The bioleaching bioreactor having an air injection and diffusion system, according to claim 6, wherein the spraying/dispersion system includes a spraying device to pressure-spread the water entering the inner tube and a dispersion nozzle assisting improving the air distribution at a core of the pulp being subjected to a bleaching reaction in the reactor body.

9. The bioleaching bioreactor having an air injection and diffusion system, according to claim 5, wherein the vapor cleaning and recovery system includes
    at least two cooling steps and consists of a cylindrically-shape cylindrical main body, having a vapor inlet nozzle at a lower end and a clean gas outlet nozzle at an upper end; and,
    at least a pair of a first and second condensing devices to cool, condense and recover water vapors from the bioreactor, located inside the main body.

10. The bioleaching bioreactor having an air injection and diffusion system, according to claim 9, wherein the first condensing device consists of a pair of cooling coils, one main and one secondary, interconnected to each other and distributed inside and along the cylindrical main body around the second condensing device, with a cold water inlet and a hot water outlet, located in the cylindrical main body at lower and upper ends thereof, respectively.

11. The bioleaching bioreactor having an air injection and diffusion system, according to claim 10, wherein the second condensing device is located inside the cylindrical main body all along and at a center thereof, which consists of a cooling water circulation central system comprising:
- a casing to contain the cooling water, and,
- a tube located inside said casing at a center and all along thereof, where the cooling water exits once used,
- a cold water inlet interconnected to the casing, and
- a hot water outlet interconnected to a tube, both the cold water inlet and hot water outlet located opposite to each other at an upper end of the casing and protruding outside the cylindrical main body through the upper end thereof.

12. The bioleaching having an air injection and diffusion system, according to claim 11, wherein the vapor cleaning and recovery system is readily dismountable to carry out internal maintenance and cleaning operations.

13. The bioleaching bioreactor having an air injection and diffusion system, according to claim 1, wherein the bioreactor contains Acidianusbrierleyi and Metallosphaerasedula-type extreme thermophilic bacteria strains.

14. The bioleaching bioreactor having an air injection and diffusion system, according to claim 13, wherein the bioreactor is configured to operate in a temperature range from 45° C. to 80° C. and at a pressure from 1.406 kg/cm2 to 2.109 kg/cm2.

15. The bioleaching bioreactor having an air injection and diffusion system, according to claim 14, wherein the bioreactor is configured to operate at a temperature of 70° C. and a pressure of 1.7575 kg/cm2.

16. The bioleaching bioreactor having an air injection and diffusion system, according to claim 15, further comprising band-shape electric heaters to maintain the temperature in bioreactors of larger capacity than 200 liters.

17. The bioleaching bioreactor having an air injection and diffusion system, according to claim 15, further comprising heat exchangers to maintain the temperature in bioreactors of larger capacity than 200 liters.

18. The bioleaching bioreactor having an air injection and diffusion system, according to claim 4, wherein said plurality of access ports having a circular shape and different diameters depending on the process needs.

19. A bioleaching bioreactor having an air injection and diffusion system, comprising:
- a reactor body to contain pulp to be processed and to allow the reaction to proceed;
- a support base to secure the reactor body;
- a pulp feeding device, protruding inwards of the reactor body;
- air injection and diffusion system to mix and to supply the air required by the reaction process;
- at least four vortex breaking elements located around the air injection and diffusion system inside the reactor body;
- at least a heating element to maintain reaction temperature;
- a pulp outlet port, to deliver the pulp already processed;
- a pulp inlet port, to supply the pulp to be processed;
- an air inlet port, located at an upper end of the reactor body; and, a vapor outlet port, located at the upper end of the reactor body,
- wherein the pulp feeding device protrudes inwards the reactor body through the upper cover; the air injection and diffusion system is centrally located at the upper cover and protrudes inwards the reactor body; the inner wall and along the reactor body, equidistantly separated from each other at an angle of 90°;
- the heating element is externally located and around the reactor body;
- the pulp outlet port is laterally located at a top of the reactor body;
- the pulp inlet port, is located at the upper cover of the reactor body, where the pulp feeding device is introduced inwards the reactor body;
- the air inlet port is located at the upper cover of the reactor body; and,
- the vapor outlet port is located at the upper cover of the reactor body.

* * * * *